(12) United States Patent
Hori

(10) Patent No.: US 6,568,810 B2
(45) Date of Patent: May 27, 2003

(54) ILLUMINATION OPTICAL SYSTEM AND PROJECTION DISPLAY APPARATUS INCORPORATING THE SAME

(75) Inventor: Hidehiko Hori, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 57 days.

(21) Appl. No.: 09/962,448

(22) Filed: Sep. 26, 2001

(65) Prior Publication Data

US 2002/0126259 A1 Sep. 12, 2002

(30) Foreign Application Priority Data

Mar. 8, 2001 (JP) ......................................... 2001-064419

(51) Int. Cl.[7] .......................... G03B 21/14; G02B 5/32; H04N 9/083
(52) U.S. Cl. .............................. 353/20; 353/38; 359/20; 348/291
(58) Field of Search .................. 353/20, 38; 359/20; 348/291

(56) References Cited

U.S. PATENT DOCUMENTS

| 3,995,288 A | * | 11/1976 | Yevick ........................ 396/430 |
| 5,083,854 A | * | 1/1992 | Zampolin et al. .............. 349/5 |
| 6,276,803 B1 | * | 8/2001 | Aoyama et al. ............... 353/81 |
| 6,386,709 B1 | * | 5/2002 | Seki ............................ 353/38 |
| 6,445,500 B1 | * | 9/2002 | Itoh ............................ 359/487 |
| 6,457,828 B1 | * | 10/2002 | Hayashi ....................... 353/20 |
| 6,478,429 B1 | * | 11/2002 | Aritake et al. ................ 353/31 |
| 6,491,396 B2 | * | 12/2002 | Karasawa et al. ............. 353/20 |

FOREIGN PATENT DOCUMENTS

JP   8304739   11/1996

* cited by examiner

Primary Examiner—Russell Adams
Assistant Examiner—Magda Cruz
(74) Attorney, Agent, or Firm—Birch, Stewart, Kolasch & Birch, LLP.

(57) ABSTRACT

An illumination optical system comprises a first multi-lens array, a second multi-lens array, and a polarization conversion module. An optical modulation device of a projector is irradiated with light beams that are generated by passing incident light from a light source through the first multi-lens array, the second multi-lens array, and the polarization conversion module. The number of the first lens cells is greater than that of the polarization conversion units in a direction of an arrangement of the polarization conversion units. Further, each of particular ones among the polarization conversion units corresponds to at least two first lens cells in the direction of the arrangement of the polarization conversion units. Furthermore, the first lens cell in a portion where each of the particular ones corresponds to at least two first lens cells has such a decentered shape that a vertex of the first lens cell is off a center position of the first lens cell and closer to an incident axis passing a center of an opening of the corresponding polarization conversion unit.

14 Claims, 15 Drawing Sheets

ILLUMINATION OPTICAL SYSTEM AND PROJECTION DISPLAY APPARATUS INCORPORATING THE SAME

BACKGROUND OF THE INVENTION

The present invention relates to an illumination optical system which converts randomly-polarized light into particular linearly-polarized light for illuminating a liquid crystal panel and the like, and a projection display apparatus incorporating the illumination optical system.

FIG. 15 is a horizontal sectional view showing a basic configuration of an illumination optical system of a conventional projection display apparatus, and FIG. 16 is a horizontal sectional view showing an enlarged view of a part of FIG. 15. As shown in FIG. 15 or FIG. 16, the conventional projection display apparatus comprises a light source 1, a first multi-lens array 9 configured by an arrangement of multiple first lens cells 9a, a second multi-lens array 3 configured by an arrangement of multiple second lens cells 3a, a polarization conversion module 4 configured by an arrangement of multiple polarization conversion units 4a, a condenser lens 5, a liquid crystal panel 6 as an optical modulation device, and a projection lens 7. In the projection display apparatus, the first lens cells 9a correspond to the polarization conversion units 4a in a one-to-one relationship, in a horizontal direction 10 orthogonal to a system optical axis 8. Multiple secondary light source images formed by the first multi-lens array 9 are converged in the vicinity of the second multi-lens array 3. The randomly-polarized light passing the second multi-lens array 3 is converted to linearly-polarized light by the polarization conversion module 4 and directed through the condenser lens 5 onto the liquid crystal panel 6. The light passing the liquid crystal panel 6 is modulated in accordance with a video signal input to the liquid crystal panel 6, and the projection lens 7 provides an enlarged projection on the screen (not shown).

However, it has been difficult to downsize the illumination optical system (and downsize the projection display apparatus) and to enhance the brightness of the display image hand in hand, with the conventional projection display apparatus as described above.

One reason that makes downsizing difficult is that a reduction in a distance $L_6$ (a distance from the second multi-lens array 3 to the liquid crystal panel 6) in FIG. 15 is not allowed in many cases because of the constraints that optical components such as a reflecting mirror must be placed.

In addition, a reason that makes it difficult for the downsizing and the enhancement of the brightness to be compatible is that a reduction in a distance $L_9$ (a distance from the first multi-lens array 9 to the second multi-lens array 3) in FIG. 15 increases the incident angle of the light incident to the opening 4b (width $H_4/2$) of the polarization conversion unit 4a, consequently degrading the intensity of the transmission light (and reflection light). In this connection, FIG. 17 shows a relationship between the incident angle of the polarization conversion unit 4a and the transmittance (and reflectivity) of the transmission light (and reflection light) (that is, incident angle characteristics). Here, the incident angles are the angles $\theta_0$ and $\theta_1$ of the incident light beams (straight-line segments 11 and 12) with respect to the reference line 13 which is at a 45° angle with respect to the polarization separation surface 4e of the polarization conversion unit 4a, as shown in the horizontal sectional view of FIG. 18 and its enlarged view of FIG. 19. As shown in FIG. 17, as a difference between the incident angle and a reference angle 0° increases, the intensity of the incident light (and reflection light) decreases.

Furthermore, another reason that makes it difficult for the downsizing and the enhancement of the brightness to be compatible is that if the width $H_9$ of the first lens cell 9a is reduced while maintaining a conjugated relationship between the first lens cell 9a and the liquid crystal panel 6 (relationship expressed as $H_6/H_9=L_6/L_9$) when reducing the distance $L_9$ in FIG. 15, the width $H_4/2$ of the opening 4b of the polarization conversion unit 4a must also be reduced, which would consequently demand a further high assembly precision and increase the risk of reduction in the amount of incident light (amount of light that can pass the opening 4b) owing to an assembly error.

SUMMARY OF THE INVENTION

It is an object of the present invention to provide a compact illumination optical system that can irradiate an area to be irradiated with a high intensity and a compact projection display apparatus that can provide a highly bright display image.

According to one aspect of the present invention, an illumination optical system comprises a first multi-lens array which includes a plurality of first lens cells, the first multi-lens array dividing incident light to form plurality of light beams and condensing each light beam, thereby forming a plurality of images; a second multi-lens array which includes a plurality of second lens cells, the second lens cells converging the plurality of images, respectively; and a polarization conversion module which includes an arrangement of a plurality of polarization conversion units, each polarization conversion unit converting randomly-polarized light into particular linearly-polarized light, a predetermined area being irradiated with the plurality of light beams which are generated by passing the incident light through the first multi-lens array, the second multi-lens array, and the polarization conversion module, wherein number of the first lens cells is greater than number of the polarization conversion units in a direction of the arrangement of the polarization conversion units; wherein each of particular ones among the polarization conversion units corresponds to at least two first lens cells in the direction of the arrangement of the polarization conversion units; wherein the first lens cell in a portion where each of the particular ones among the polarization conversion units corresponds to at least two first lens cells has such a decentered shape that a vertex of the first lens cell is off a center position of the first lens cell and closer to an incident axis passing a center of an opening of the corresponding polarization conversion unit.

In the illumination optical system, the width of the first lens cell is smaller than that of the conventional one, and the size of the image is also smaller than the size of the conventional one. Accordingly, the ratio of light incident to the opening of the polarization conversion unit of the polarization conversion module can be increased to enhance the utilization factor of light. In addition, the first lens cell has such a decentered shape that the vertex is off the center position of the first lens cell and closer to the incident axis passing the center of the opening of the corresponding polarization conversion unit, so that the incident angle of pencils of light incident to the polarization conversion unit can be brought closer to 0°, increasing the amount of light that passes the polarization conversion unit. Accordingly, the illumination optical system can enhance the intensity of light on the surface to be irradiated.

In addition, because the width of the first lens cell is smaller than the width of the polarization conversion unit in the illumination optical system, the distance from the first multi-lens array to the second multi-lens array can be reduced, so that the illumination optical system can be downsized.

Further, according to another aspect of the present invention, a projection display apparatus comprises a light source; a first multi-lens array which includes a plurality of first lens cells, the first multi-lens array dividing incident light to form plurality of light beams and condensing each light beam, thereby forming a plurality of images; a second multi-lens array which includes a plurality of second lens cells, the second lens cells converging the plurality of images, respectively; a polarization conversion module which includes an arrangement of a plurality of polarization conversion units, each polarization conversion unit converting randomly-polarized light into particular linearly-polarized light; and an optical modulation device being irradiated with the plurality of light beams which are generated by passing the incident light through the first multi-lens array, the second multi-lens array, and the polarization conversion module; wherein number of the first lens cells is greater than number of the polarization conversion units in a direction of the arrangement of the polarization conversion units; wherein each of particular ones among the polarization conversion units corresponds to at least two first lens cells in the direction of the arrangement of the polarization conversion units; wherein the first lens cell in a portion where each of the particular ones among the polarization conversion units corresponds to at least two first lens cells has such a decentered shape that a vertex of the first lens cell is off a center position of the first lens cell and closer to an incident axis passing a center of an opening of the corresponding polarization conversion unit.

Further, because the width of the first lens cell in the projection display apparatus is smaller than the width of the conventional one, the size of the image also becomes smaller than the conventional one. Accordingly, the ratio of light incident to the opening of the polarization conversion unit of the polarization conversion module can be increased to enhance the utilization factor of light. In addition, the first lens cell has such a decentered shape that the vertex is off the center position of the first lens cell and closer to the incident axis passing the center of the opening of the corresponding polarization conversion unit, so that the incident angle of pencils of light incident to the polarization conversion unit can be brought closer to 0°, increasing the amount of light that passes the polarization conversion unit. Accordingly, the projection display apparatus can enhance the brightness of the display image.

Furthermore, because the width of the first lens cell is smaller than the width of the polarization conversion unit in the projection display apparatus, the distance from the first multi-lens array to the second multi-lens array can be reduced, so that the projection display apparatus can be downsized.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

First Embodiment

Figure 1:
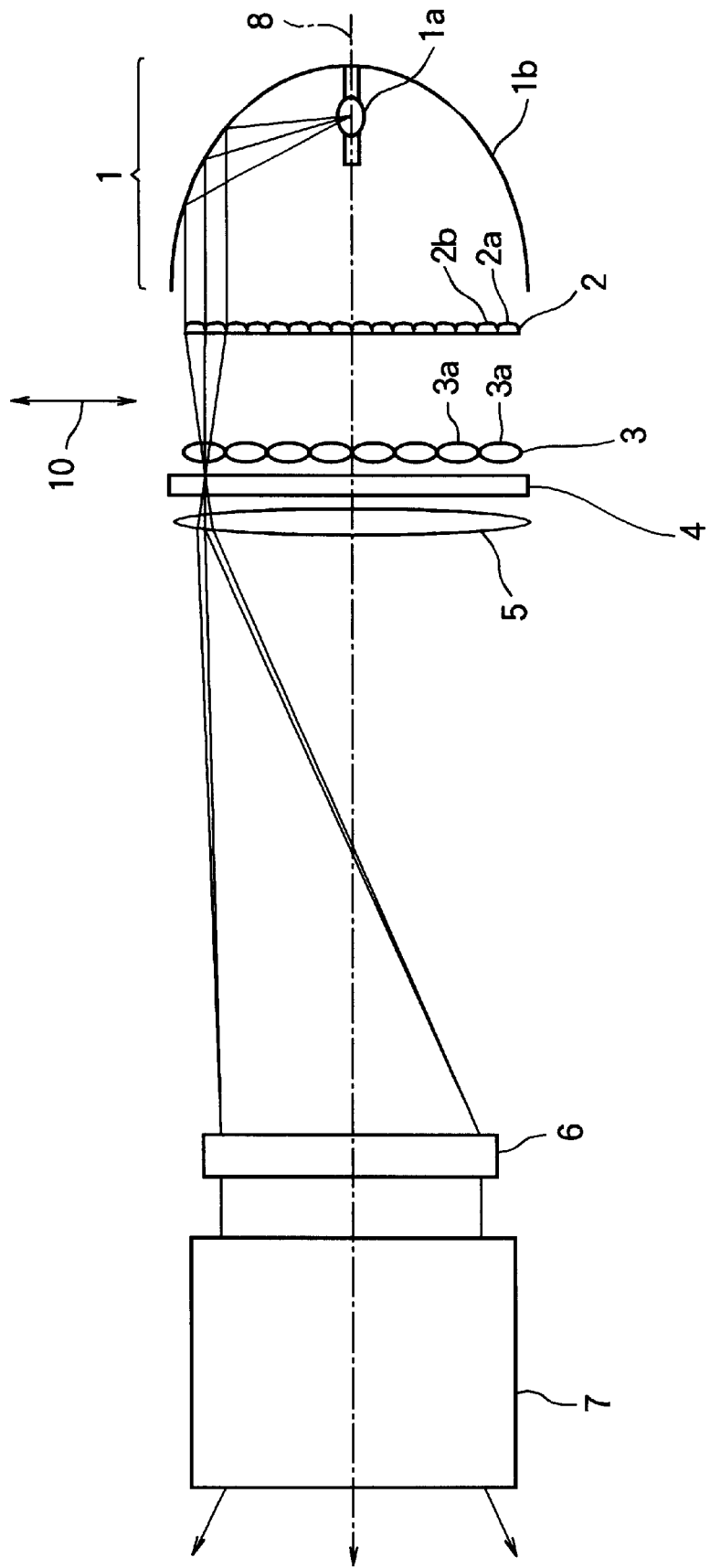
FIG. 1 is a horizontal sectional view schematically showing a basic configuration of a projection display apparatus according to a first embodiment of the present invention.

FIG. 1 is a horizontal sectional view schematically showing a basic configuration of a projection display apparatus according to the first embodiment of the present invention. As shown in FIG. 1, the projection display apparatus according to the first embodiment has a light source 1, a first multi-lens array 2, a second multi-lens array 3, a polarization conversion module 4, a condenser lens 5, a liquid crystal panel 6, and a projection lens 7. The major components of the light source 1 are a lamp 1a and a reflecting mirror 1b. As the lamp 1a, a halogen lamp, a metal halide lamp, a high-pressure mercury-vapor lamp, or the like is used, for instance. As the reflecting mirror 1b, a concave mirror having a surface in the shape of a paraboloid of revolution, a surface in the shape of an ellipsoid of revolution, a surface in the shape of a sphere of revolution, or the like is used, for instance. In FIG. 1, a reference numeral 8 denotes a system optical axis, which is an optical axis of the projection display apparatus.

Figure 2:
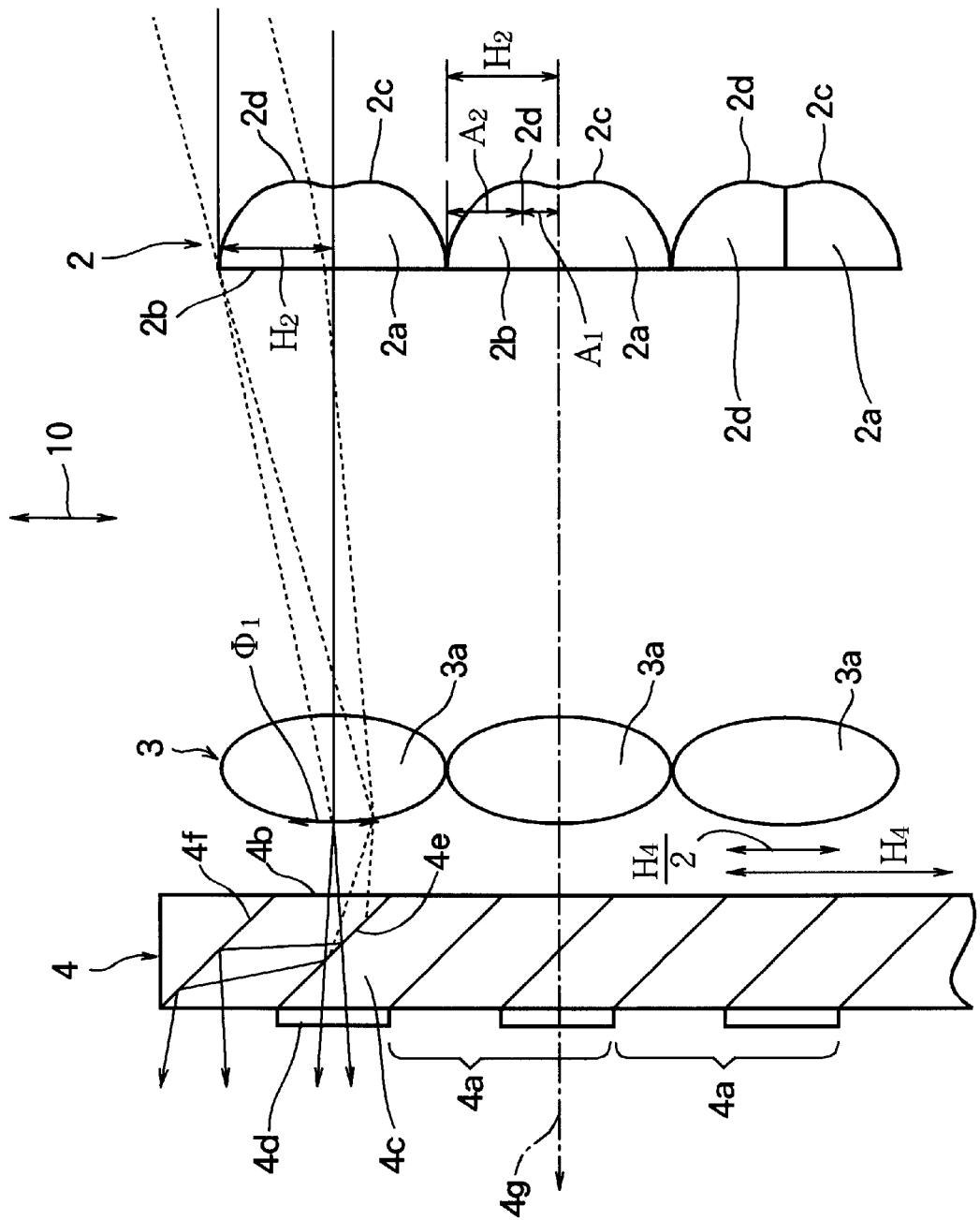
FIG. 2 is a horizontal sectional view schematically showing a part of an illumination optical system of FIG. 1.
Figure 3:
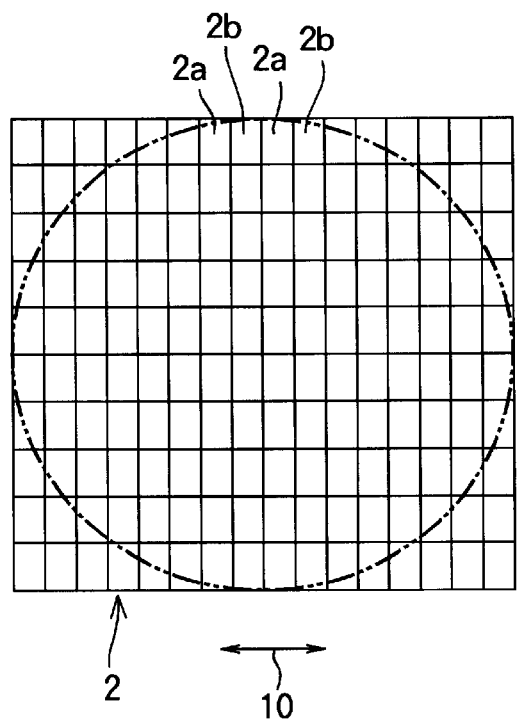
FIG. 3 is a front view schematically showing a first multi-lens array in FIG. 2.
Figure 4:
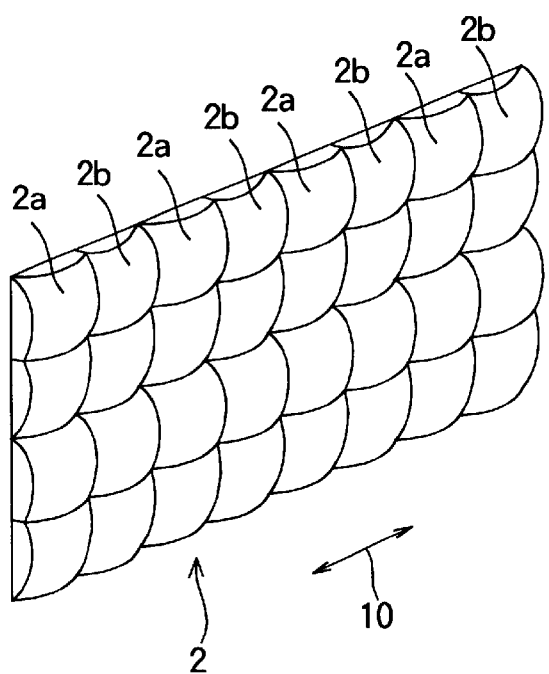
FIG. 4 is a perspective view schematically showing a part of the first multi-lens array in FIG. 2.

FIG. 2 is a horizontal sectional view schematically showing a part of an illumination optical system in the projection display apparatus of FIG. 1. FIG. 3 is a front view schematically showing the first multi-lens array 2, and FIG. 4 is a perspective view schematically showing a part of the first multi-lens array 2. As shown in FIG. 2 to FIG. 4, the first multi-lens array 2 has such a construction that a plurality of small condenser lenses (hereinafter referred to as first lens cells) 2a and 2b are arranged in a plane orthogonal to the system optical axis 8. The first lens cells 2a and 2b individually form a secondary light source image in the vicinity of the second multi-lens array 3. In FIG. 3, a circle shown by the two-dotted chain line represents light from the light source 1. FIG. 2 to FIG. 4 schematically show the first lens cells 2a and 2b constituting the first multi-lens array 2, and the number and arrangement of the first lens cells 2a and 2b are not limited to those shown in the figures. The first lens cells 2a and 2b shown in the figures have a convex surface on one side and a flat surface on the other side, but are not limited to the shown shape in the present invention, and may have convex surfaces on both sides or another different geometry if a secondary light source image can be formed in the vicinity of the second multi-lens array 3 with that shape.

Figure 5:
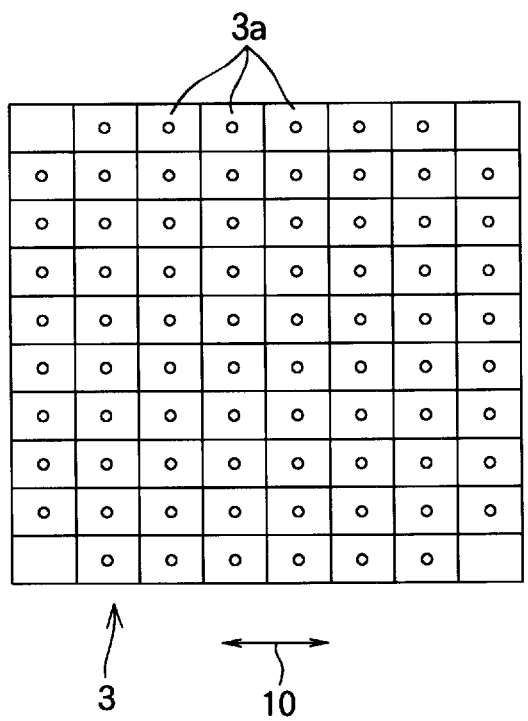
FIG. 5 is a front view schematically showing a second multi-lens array in FIG. 2.
Figure 6:
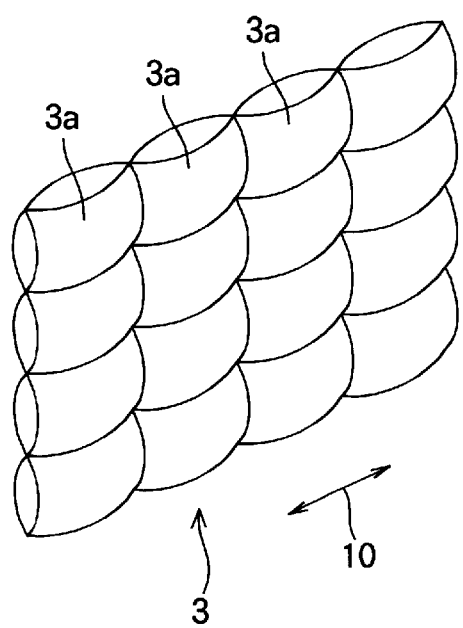
FIG. 6 is a perspective view schematically showing a part of the second multi-lens array in FIG. 2.

FIG. 5 is a front view schematically showing the second multi-lens array 3, and FIG. 6 is a perspective view schematically showing a part of the second multi-lens array 3. As shown in FIG. 2, FIG. 5, and FIG. 6, the second multi-lens array 3 has such a construction that a plurality of small condenser lenses (hereinafter referred to as second lens cells) 3a are arranged in a plane orthogonal to the system optical axis 8. In FIG. 5, circles shown in the second lens cells 3a represent pencils of light that are generated by passing the light from the light source 1 through the first multi-lens array 2. FIG. 2, FIG. 5, and FIG. 6 schematically show the second lens cells 3a constituting the second multi-lens array 3, and the number, arrangement, and geometries of the second lens cells 3a are not limited to those shown in the figures.

Figure 7:
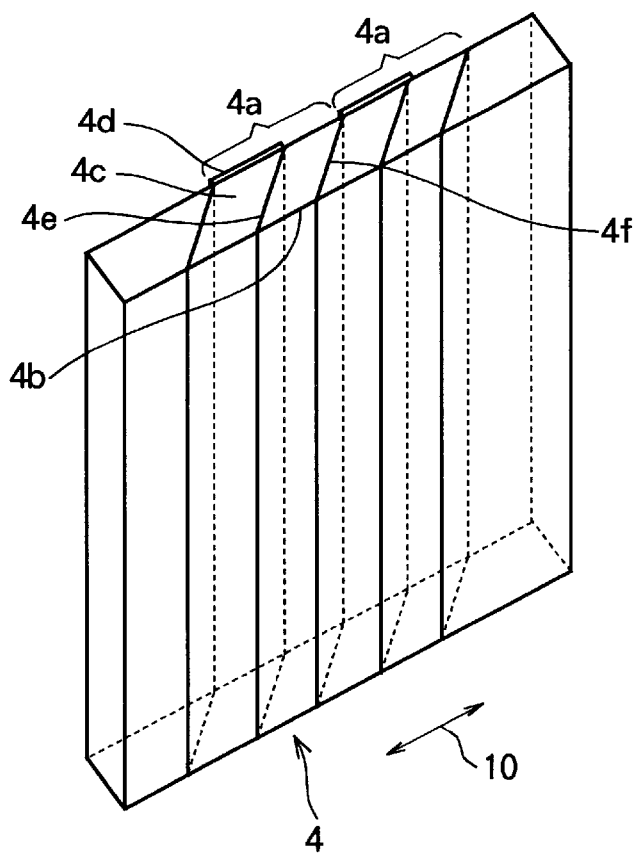
FIG. 7 is a perspective view schematically showing a part of a polarization conversion module in FIG. 2.
Figure 8:
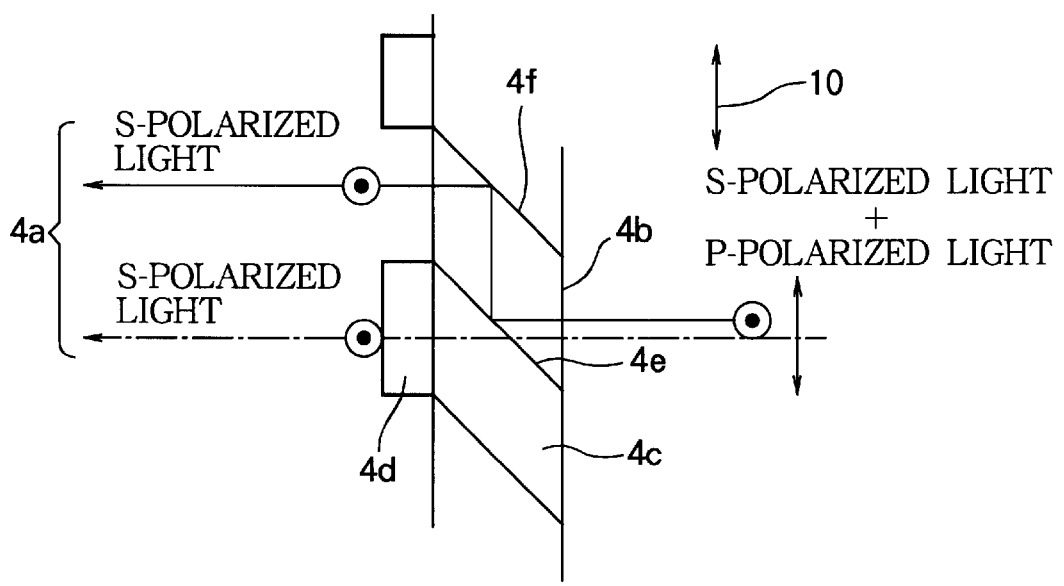
FIG. 8 illustrates the principle of the polarization conversion module of FIG. 2.

FIG. 7 is a perspective view schematically showing a part of the polarization conversion module 4, and FIG. 8 illustrates the principle of the polarization conversion module 4. As shown in FIG. 2 and FIG. 7, the polarization conversion module 4 is configured by arranging a plurality of long lengths of polarization conversion units 4a in the horizontal direction 10 in a plane orthogonal to the system optical axis 8. A single polarization conversion unit 4a comprises the polarization beam splitter (PBS) 4c and the λ/2 wave plate 4d. As shown in FIG. 8, when light having random planes of polarization enters from the opening 4b, the P-polarized light passes the polarization separation surface 4e of the PBS 4c, passes the λ/2 wave plate 4d, and is consequently output as the S-polarized light. The incident S-polarized light is reflected by the polarization separation surface 4e of the PBS 4c, reflected by the reflecting surface 4f, and then output. FIG. 8 illustrates an example of converting incident light into the S-polarized light, but a configuration for outputting the P-polarized light is also possible. A type of liquid crystal panel which turns the angle of polarization can use light of just either the P-polarized light or S-polarized light, so that the utilization factor of light can be improved by converting the light that is not used into linearly-polarized light beams that can be used by the liquid crystal panel 6 by turning the angle of polarization by 90° and mixing the light of the other polarization angle.

Figure 16:
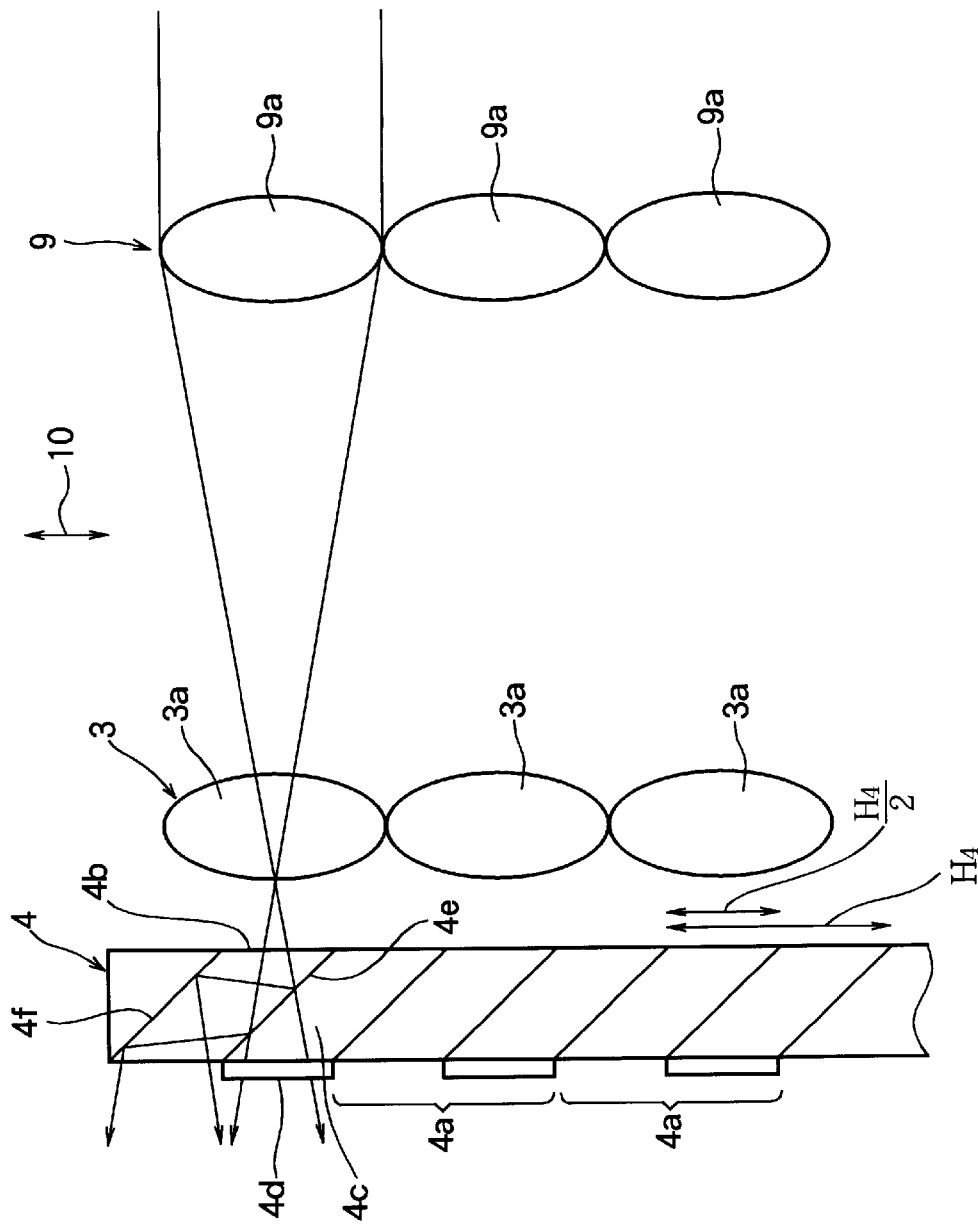
FIG. 16 is a horizontal sectional view showing an illumination optical system of FIG. 15.
Figure 17:
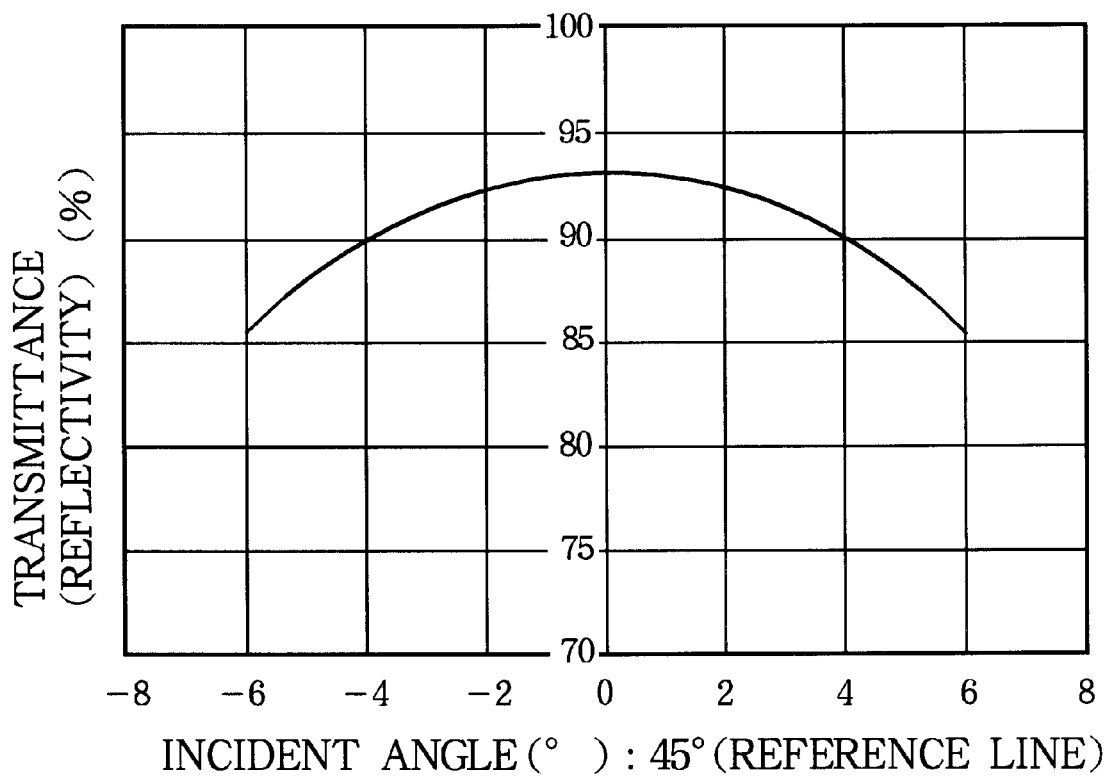
FIG. 17 is a graph showing a relationship between an incident angle of the polarization conversion unit and transmittance (reflectivity) of the transmission light (reflection light) (incident angle characteristics)
Figure 18:
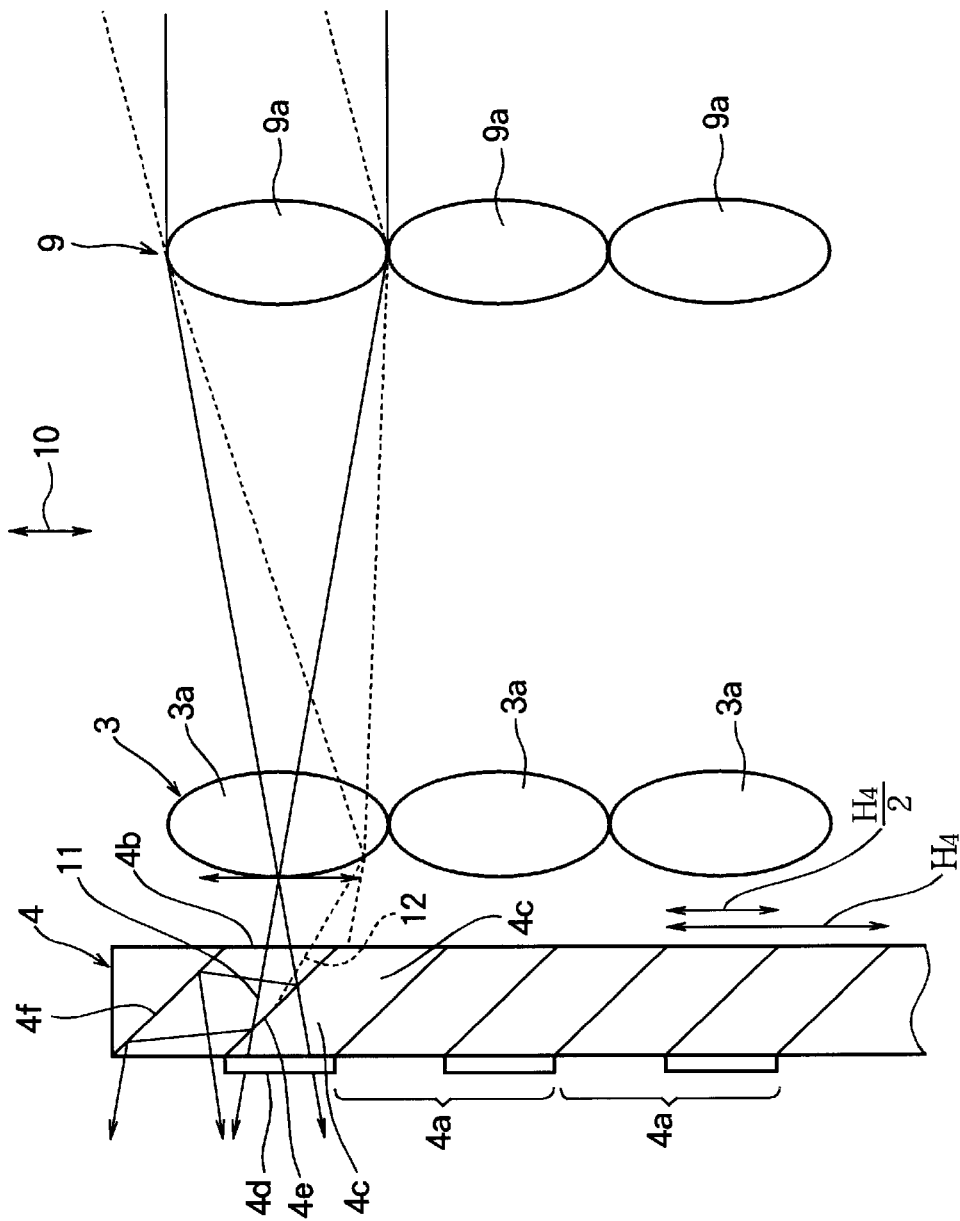
FIG. 18 is a horizontal sectional view showing an incident angle of light incident to the polarization conversion unit in the conventional projection display apparatus.
Figure 19:
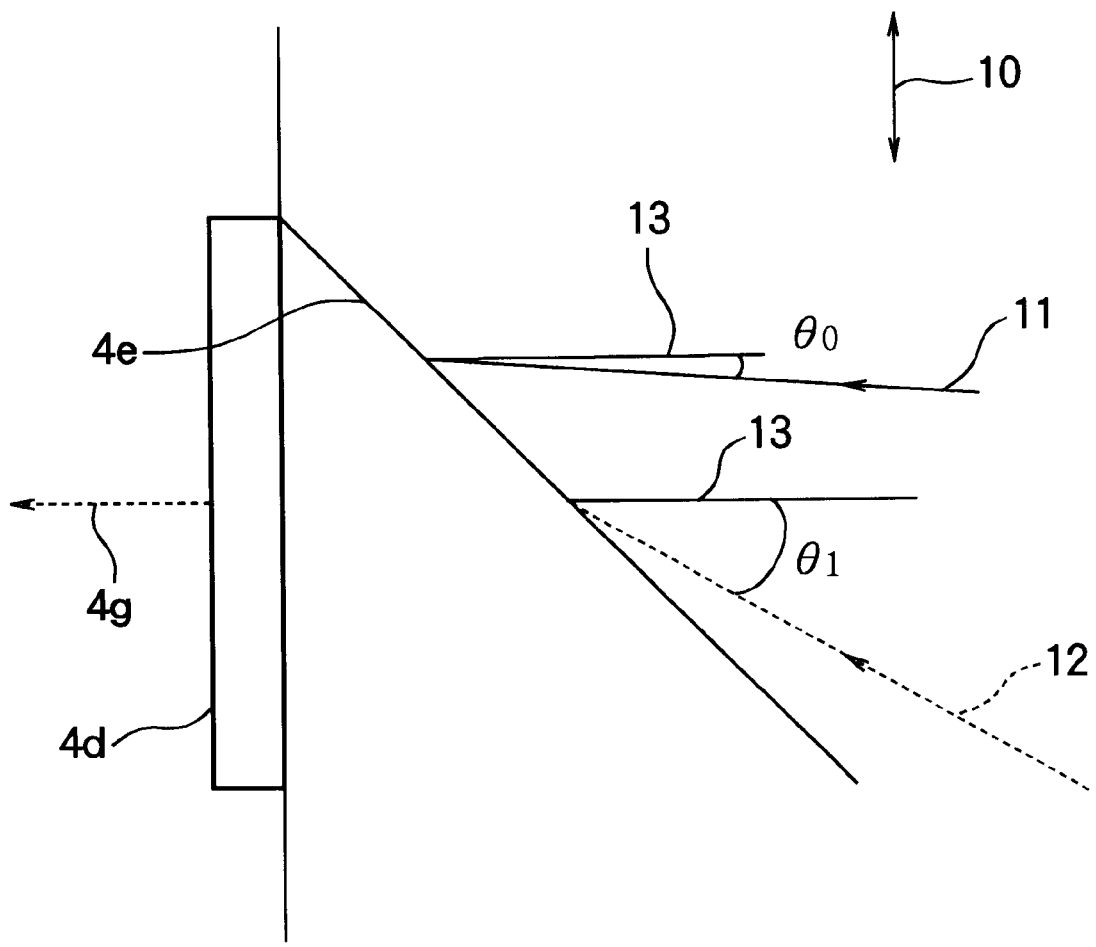
FIG. 19 is an enlarged view of a part of FIG. 18.

In the first embodiment, there is a one-to-one correspondence between the second lens cells 3a constituting the second multi-lens array 3 and the polarization conversion units 4a constituting the polarization conversion module 4, in the horizontal direction 10 orthogonal to the system optical axis 8 (that is, in the direction in which the polarization conversion units 4a are arranged). In addition, in the direction 10 of the arrangement of the polarization conversion units 4a, the first lens cells 2a and 2b constituting the first multi-lens array 2 outnumber the polarization conversion units 4a constituting the polarization conversion module 4. More specifically, a single polarization conversion unit 4a corresponds to two first lens cells 2a and 2b. In FIG. 1, each one of all the polarization conversion units 4a constituting the polarization conversion module 4 corresponds to two first lens cells 2a and 2b. However, each polarization conversion unit of a part (just several outer rows or just several central rows, for instance) of the polarization conversion units 4a constituting the polarization conversion module 4 may correspond to two first lens cells 2a and 2b, and each of the other polarization conversion units 4a may correspond to a single lens cell (not shown) constituting the first multi-lens array 2. Further, a part (just around the center or just around the rim, for instance) of the first multi-lens array 2 may be comprised of the first lens cells 2a and 2b as shown in FIG. 2, and the other part may be configured in the same way as the conventional lens cell shown in FIG. 16. Furthermore, if a single polarization conversion unit 4a corresponds to a plurality of first lens cells, the number of the corresponding first lens cells is not limited to two and may be three or greater, and the number of the corresponding first lens cells can be determined on basis of requirements such as the distance between the first multi-lens array 2 and the polarization conversion module 4 and the characteristics of the polarization conversion module 4.

As shown in FIG. 2, in the first embodiment, the first lens cells 2a and 2b have such decentered shapes that the vertices 2c and 2d are off the center positions of the first lens cells 2a and 2b and closer to the incident axis 4g passing the center of the opening 4b of the corresponding polarization conversion unit 4a, in a portion in which a single polarization conversion unit 4a corresponds to two first lens cells 2a and 2b. In other words, a distance $A_1$ from the vertices 2c and 2d to the incident axis 4g is smaller than a distance $A_2$ from the vertices 2c and 2d to the edges of the first lens cells 2a and 2b.

Figure 9:
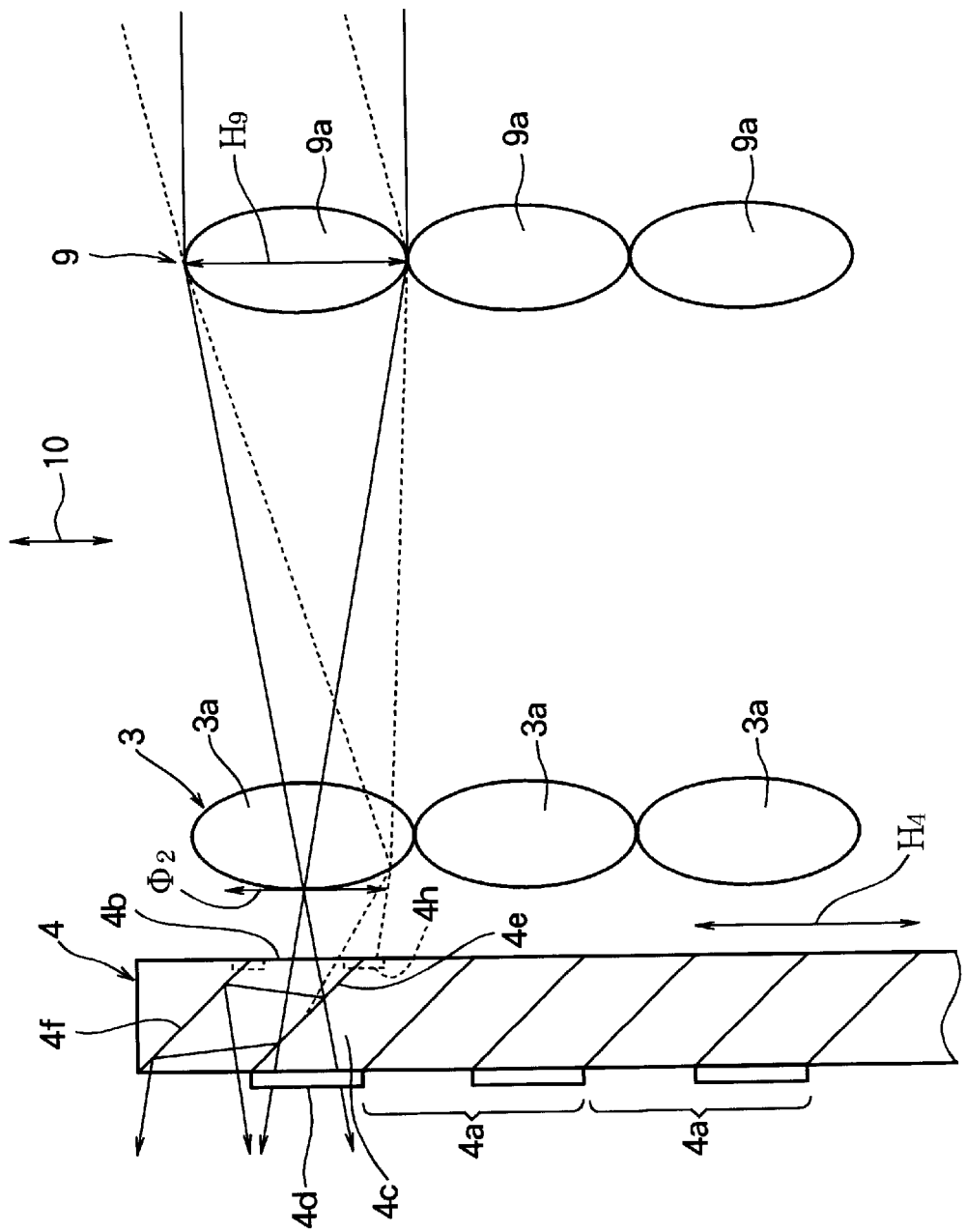
FIG. 9 is a horizontal sectional view schematically showing an illumination optical system of the conventional projection display apparatus.

As has been described above, in the first embodiment, the width $H_2$ of the first lens cells 2a and 2b is set to ½ of the width $H_9$ of the conventional first lens cell 9a shown in FIG. 9, so that the size $\Phi_1$ of the secondary light source image is also ½ of the size $\Phi_2$ of the conventional secondary light source image. As a comparison between FIG. 2 and FIG. 9 shows, because the size of the secondary light source image is reduced in the first embodiment, the ratio of light incident to the opening 4b of the polarization conversion unit 4a of the polarization conversion module 4 can be increased to enhance the utilization factor of light.

In addition, the first lens cells 2a and 2b have such decentered shapes that the vertices 2c and 2d are off the center positions of the first lens cells 2a and 2b and closer to the incident axis 4g passing the center of the opening 4b of the corresponding polarization conversion unit 4a, so that the incident angle of the pencils of light incident to the polarization conversion unit 4a can be brought closer to 0°. Accordingly, the transmittance (and reflectivity) of the incident light can be enhanced, increasing the amount of light passing the polarization conversion unit 4a, which makes it possible to improve the brightness of the display image.

Moreover, in the first embodiment, the first lens cells 2a and 2b and the liquid crystal panel 6 have a conjugated relationship, holding $L_2/H_2=L_6/H_6$. Here, $H_6$ is the width of the liquid crystal panel 6, $H_2$ is the width of the first lens cell 2a or 2b, $L_6$ is the distance from the second multi-lens array 3 to the liquid crystal panel 6, and $L_2$ is the distance from the second multi-lens array 3 to the first multi-lens array 2. As has been described above, because the distance $L_2$ from the second multi-lens array 3 to the first multi-lens array 2 is halved by halving the width $H_2$ of the first lens cell 2a or 2b in the first embodiment, the projection display apparatus (and the illumination optical system) can be downsized.

Second Embodiment

Figure 10:
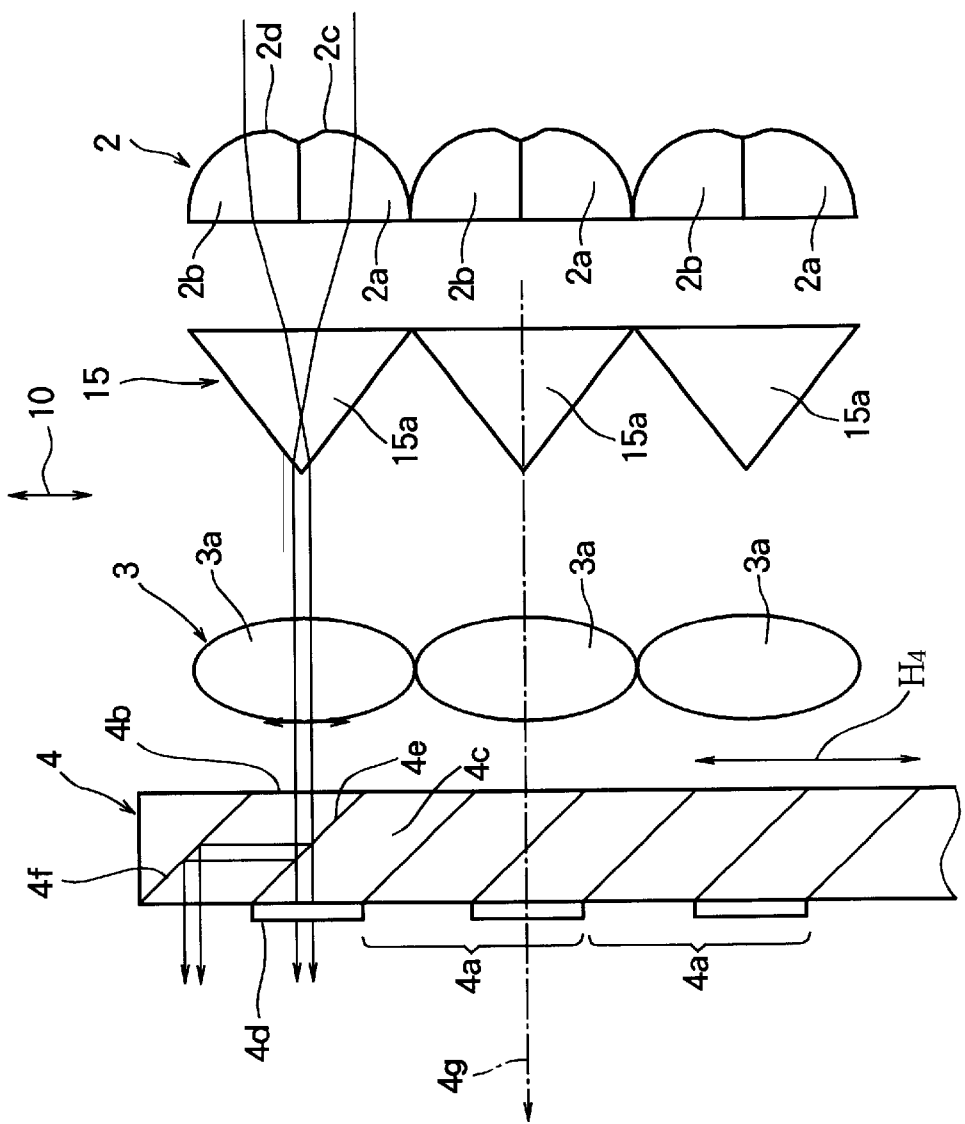
FIG. 10 is a horizontal sectional view schematically showing a part of an illumination optical system of a projection display apparatus according to a second embodiment of the present invention.

FIG. 10 is a horizontal sectional view schematically showing a part of an illumination optical system of a projection display apparatus according to the second embodiment of the present invention. The projection display apparatus according to the second embodiment has a superimposing device 15 between the first multi-lens array 2 and the second multi-lens array 3. The superimposing device 15 has a function of superimposing a plurality of secondary light source images formed by the multiple first lens cells 2a and 2b corresponding to the individual polarization conversion units 4a, in the vicinity of the second lens cell 3a.

Figure 11:
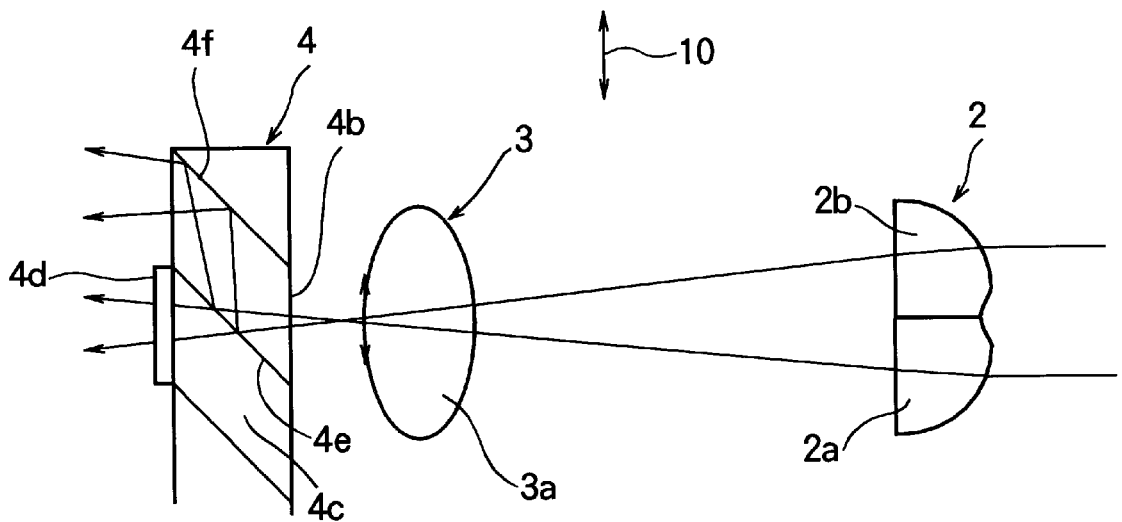
FIG. 11 is a horizontal sectional view showing an example to be compared with the projection display apparatus according to the second embodiment.

As shown in FIG. 11, if the secondary light source images formed by the two second lens cells 2a and 2b of the first multi-lens array 2 are superimposed on the same position, the light emitted from the polarization conversion module 4 diverges, making appropriate superimposition upon the modulation area of the liquid crystal panel 6 difficult and accordingly degrading the utilization factor of light. However, by providing the superimposing device 15, the utilization factor of light can be enhanced.

Figure 12:
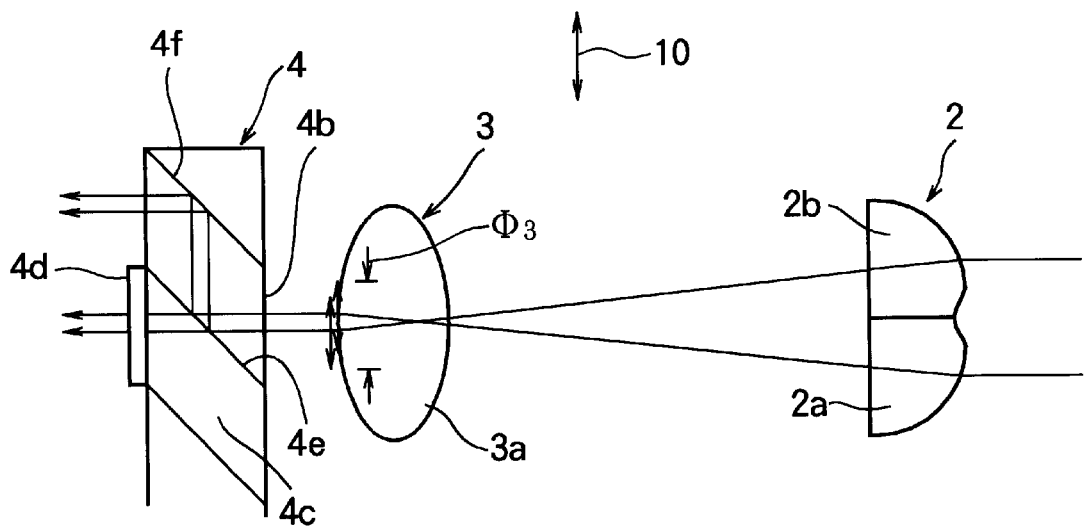
FIG. 12 is a horizontal sectional view showing another example to be compared with the projection display apparatus of second embodiment.

In addition, as shown in FIG. 12, if the light passing through the optical axis of the first lens cells 2a and 2b emits from the second multi-lens array 3 in parallel with the system optical axis 8 so that the light emitted from the polarization conversion module 4 does not disperse, the individual secondary light source images are not superimposed on the same position, and the size $\Phi_3$ of the superimposed secondary light source image increases. However, by providing the superimposing device 15, the light emitted from the second multi-lens array 3 can be emitted in parallel with the system optical axis 8 without increasing the secondary light source image in size.

As the superimposing device 15 in the second embodiment, a plurality of triangular-prismatic optical units 15a extending in the direction of the length of the polarization conversion unit 4a (vertical direction) are arranged in the direction 10 of the arrangement of the polarization conversion units 4a. The triangular-prismatic optical units 15a are disposed in such a manner that the base of the triangle in the horizontal cross section is in the plane of incidence and the vertex is in the emitting face. In addition, the quantity matches the number of the polarization conversion units 4a of the polarization conversion module 4 in the horizontal direction.

As shown in FIG. 10, the light emitted from the first lens cell 2a of the first multi-lens array 2 and the light emitted from the first lens cell 2b can have almost the same optical axis and can become parallel to the system optical axis 8, owing to the superimposing device 15. Accordingly, the superimposed secondary light source image does not increase in size $\Phi_1$ and can efficiently pass the polarization conversion module 4, so that the brightness of the display image can be enhanced. In other respects, the second embodiment is the same as the first embodiment described above.

Third Embodiment

Figure 13:
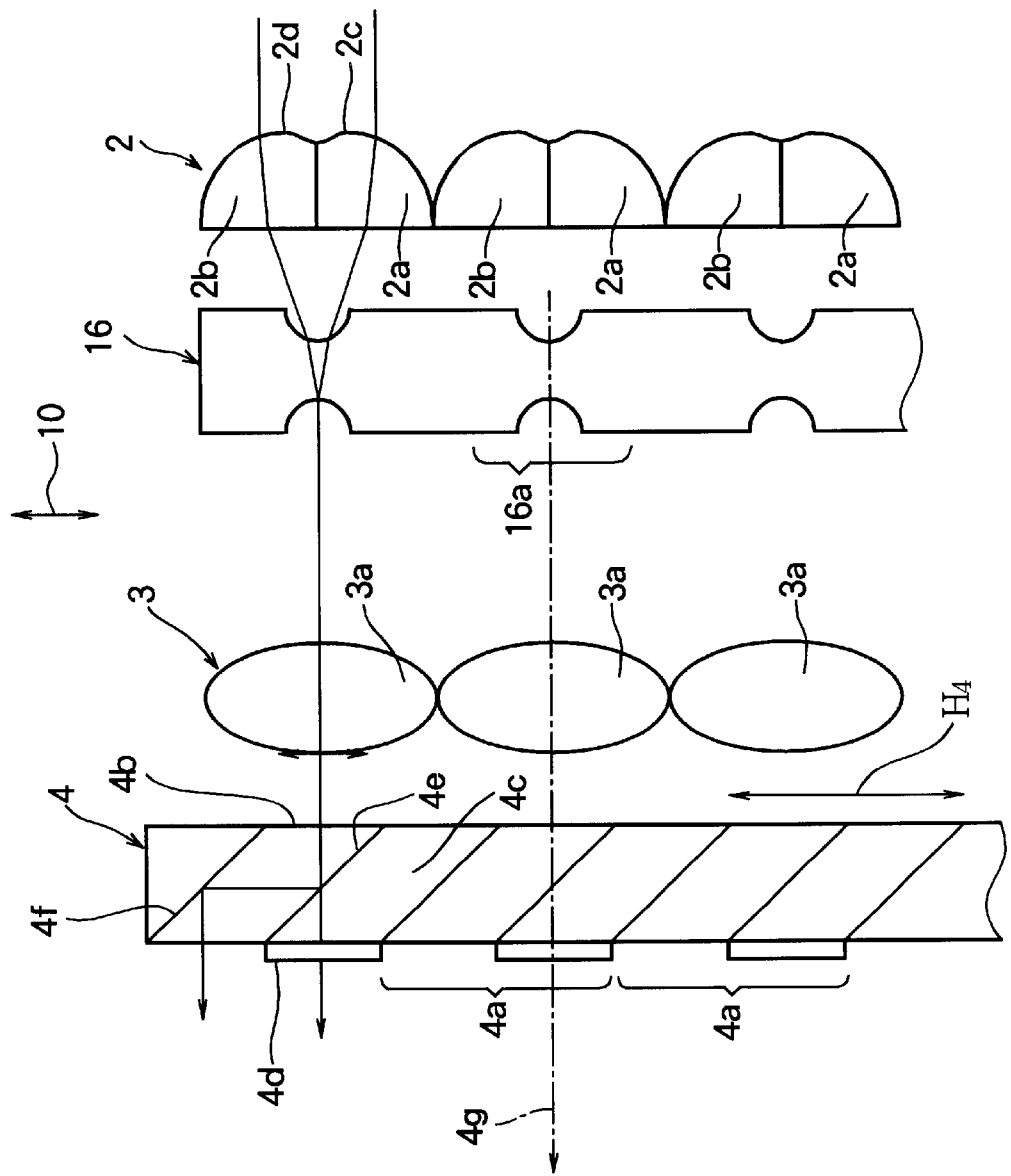
FIG. 13 is a horizontal sectional view schematically showing a part of an illumination optical system of a projection display apparatus according to a third embodiment of the present invention.

FIG. 13 is a horizontal sectional view schematically showing a part of an illumination optical system of a projection display apparatus according to the third embodiment of the present invention. The projection display apparatus according to the third embodiment has a superimposing device 16 between the first multi-lens array 2 and the second multi-lens array 3. The superimposing device 16 has a function of superimposing a plurality of secondary light source images formed by the first lens cells 2a and 2b, in the vicinity of the second lens cell 3a. The superimposing device 16 comprises a plurality of concave-prismatic lenses 16a having a horizontal cross section shaped like a concave lens which correspond to the individual polarization conversion units 4a, arranged in the direction 10 of the arrangement of the polarization conversion units. The number of the concave-prismatic lenses 16a matches the number of the polarization conversion units 4a of the polarization conversion module 4 in the horizontal direction.

As shown in FIG. 13, the light emitted from the first lens cell 2a of the first multi-lens array 2 and the light emitted from the first lens cell 2b can have almost the same optical axis and can become parallel to the system optical axis 8, owing to the superimposing device 16. Accordingly, the superimposed secondary light source image does not increase in size $\Phi_1$ and can efficiently pass the polarization conversion module 4, so that the brightness of the display image can be enhanced. In other respects, the third embodiment is the same as the first or second embodiment described above.

Fourth Embodiment

Figure 14:
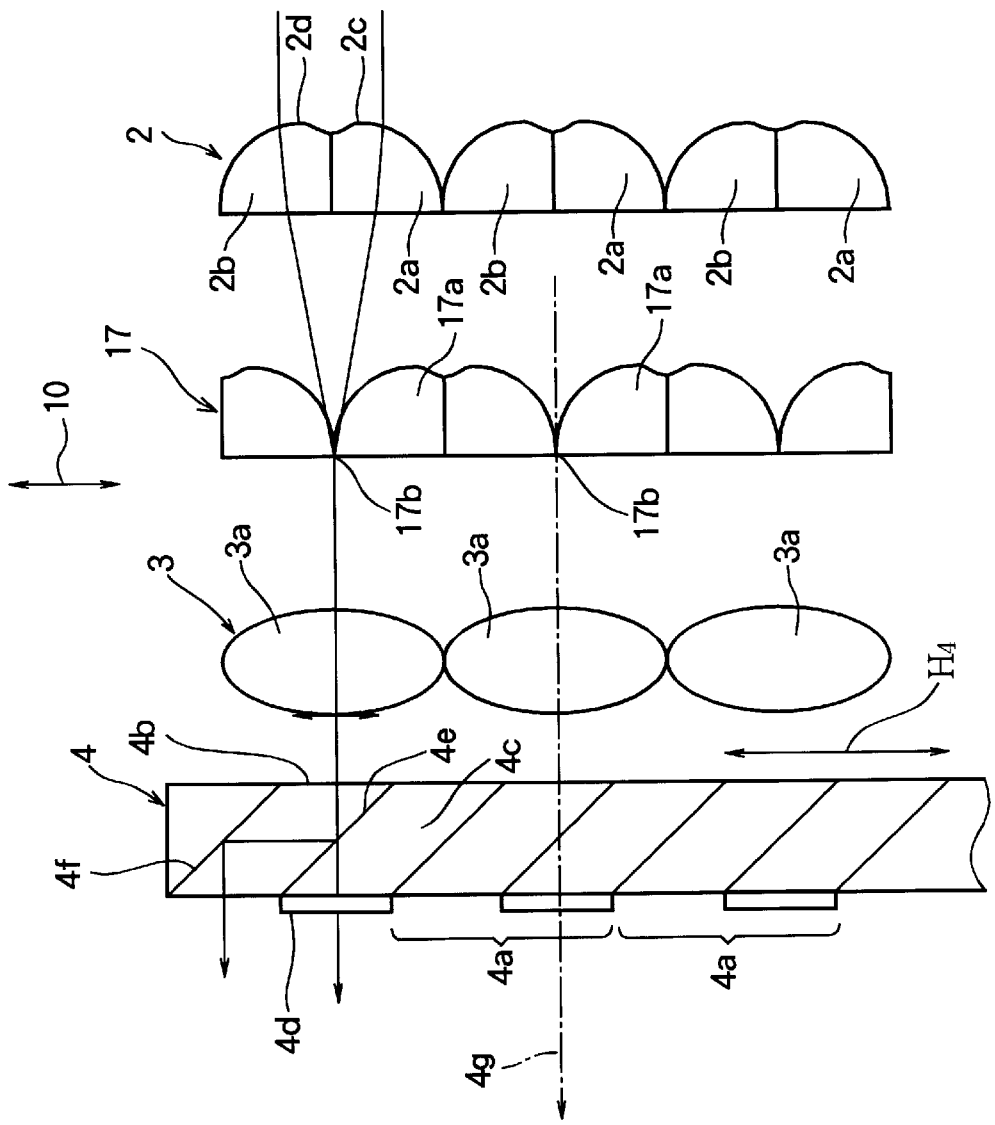
FIG. 14 is a horizontal sectional view schematically showing a part of an illumination optical system of a projection display apparatus according to a fourth embodiment of the present invention.
Figure 15:
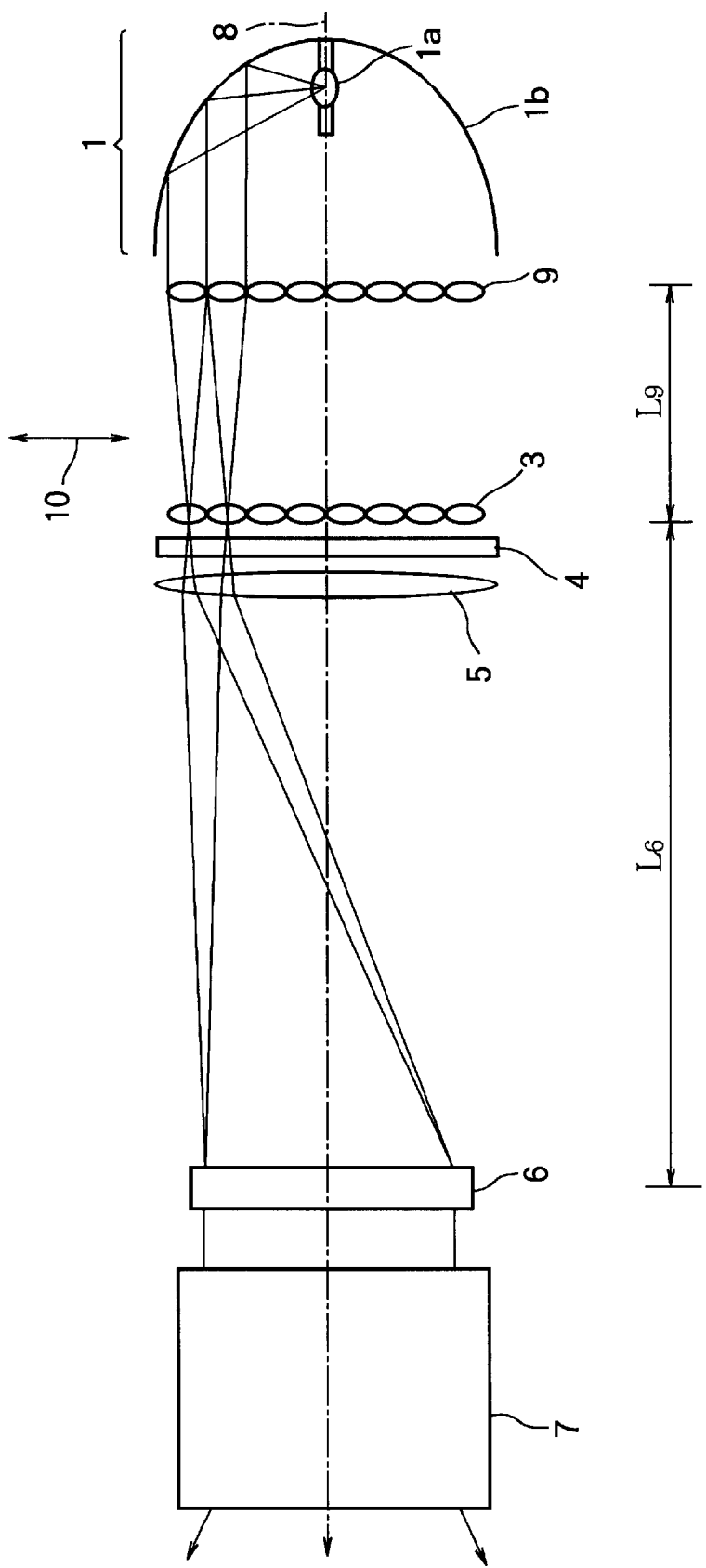
FIG. 15 is a horizontal sectional view showing a basic configuration of the conventional projection display apparatus.

FIG. 14 is a horizontal sectional view schematically showing a part of an illumination optical system of a projection display apparatus according to the fourth embodiment of the present invention. The projection display apparatus according to the fourth embodiment has a superimposing device 17 between the first multi-lens array 2 and the second multi-lens array 3. The superimposing device 17 has a function of superimposing a plurality of secondary light source images formed by the first lens cells 2a and 2b, in the vicinity of the second lens cell 3a. The superimposing device 17 comprises a plurality of convex-prismatic lenses 17a having a horizontal cross section shaped like a convex lens extending in the direction of the length of the polarization conversion unit and are arranged in the direction 10 of the arrangement of the polarization conversion units in such a manner that mating faces 17b of adjacent convex-prismatic lenses 17a are on the incident axis 4g of the polarization conversion unit 4a. In addition, the number of the convex-prismatic lenses 17a is the same as the number of the polarization conversion units 4a of the polarization conversion module 4 in the horizontal direction. In FIG. 14, the convex-prismatic lenses 17a having the same geometry as the first lens cells 2a and 2b are used.

As shown in FIG. 14, the light emitted from the first lens cell 2a of the first multi-lens array 2 and the light emitted from the first lens cell 2b can have almost the same optical axis and can become parallel to the system optical axis 8, owing to the superimposing device 15. Accordingly, the superimposed secondary light source image does not increase in size $\Phi_1$ and can efficiently pass the polarization conversion module 4, so that the brightness of the display image can be enhanced. In other respects, the fourth embodiment is the same as the first or second embodiment described above.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. An illumination optical system comprising:
   a first multi-lens array which includes a plurality of first lens cells, said first multi-lens array dividing incident light to form plurality of light beams and condensing each light beam, thereby forming a plurality of images;
   a second multi-lens array which includes a plurality of second lens cells, said second lens cells converging said plurality of images, respectively; and
   a polarization conversion module which includes an arrangement of a plurality of polarization conversion units, each polarization conversion unit converting randomly-polarized light into particular linearly-polarized light, a predetermined area being irradiated with said plurality of light beams which are generated by passing said incident light through said first multi-lens array, said second multi-lens array, and said polarization conversion module;
   wherein number of said first lens cells is greater than number of said polarization conversion units in a direction of the arrangement of said polarization conversion units;
   wherein each of particular ones among said polarization conversion units corresponds to at least two first lens cells in the direction of the arrangement of said polarization conversion units;
   wherein said first lens cell in a portion where each of said particular ones among said polarization conversion units corresponds to at least two first lens cells has such a decentered shape that a vertex of said first lens cell is off a center position of said first lens cell and closer to an incident axis passing a center of an opening of the corresponding polarization conversion unit.

2. The illumination optical system according to claim 1, wherein said particular ones among said polarization conversion units includes all of said polarization conversion units constituting said polarization conversion module.

3. The illumination optical system according to claim 1, wherein said particular ones among said polarization conversion units are some of polarization conversion units constituting said polarization conversion module.

4. The illumination optical system according to claim 1, further comprising a superimposing device which has a function of superimposing said images formed by said at least two first lens cells corresponding each of said particular ones among said polarization conversion units, in the vicinity of said second lens cells.

5. The illumination optical system according to claim 4, wherein said superimposing device includes a plurality of triangular-prismatic optical units extending in a direction of length of said polarization conversion unit, arranged in the direction of the arrangement of said polarization conversion units.

6. The illumination optical system according to claim 4, wherein said superimposing device includes a plurality of concave-prismatic lenses extending in a direction of length of said polarization conversion unit, arranged in the direction of the arrangement of said polarization conversion units.

7. The illumination optical system according to claim 4, wherein said superimposing device includes a plurality of convex-prismatic lenses extending in a direction of length of said polarization conversion unit, arranged in the direction of the arrangement of said polarization conversion units in such a manner that mating faces of adjacent convex-prismatic lenses are on the incident axis of said polarization conversion unit.

8. A projection display apparatus comprising:
   a light source;
   a first multi-lens array which includes a plurality of first lens cells, said first multi-lens array dividing incident light to form plurality of light beams and condensing each light beam, thereby forming a plurality of images;
   a second multi-lens array which includes a plurality of second lens cells, said second lens cells converging said plurality of images, respectively;
   a polarization conversion module which includes an arrangement of a plurality of polarization conversion units, each polarization conversion unit converting randomly-polarized light into particular linearly-polarized light; and
   an optical modulation device being irradiated with said plurality of light beams which are generated by passing said incident light through said first multi-lens array, said second multi-lens array, and said polarization conversion module;
   wherein number of said first lens cells is greater than number of said polarization conversion units in a direction of the arrangement of said polarization conversion units,
   wherein each of particular ones among said polarization conversion units corresponds to at least two first lens cells in the direction of the arrangement of said polarization conversion units;
   wherein said first lens cell in a portion where each of said particular ones among said polarization conversion units corresponds to at least two first lens cells has such a decentered shape that a vertex of said first lens cell is off a center position of said first lens cell and closer to an incident axis passing a center of an opening of the corresponding polarization conversion unit.

9. The projection display apparatus according to claim 8, wherein said particular ones among said polarization conversion units includes all of said polarization conversion units constituting said polarization conversion module.

10. The projection display apparatus according to claim 8, wherein said particular ones among said polarization conversion units are some of polarization conversion units constituting said polarization conversion module.

11. The projection display apparatus according to claim 8, further comprising a superimposing device which has a function of superimposing said images formed by said at least two first lens cells corresponding each of said particular ones among said polarization conversion units, in the vicinity of said second lens cells.

12. The projection display apparatus according to claim 11, wherein said superimposing device includes a plurality of triangular-prismatic optical units extending in a direction of length of said polarization conversion unit, arranged in the direction of the arrangement of said polarization conversion units.

13. The projection display apparatus according to claim 11, wherein said superimposing device includes a plurality of concave-prismatic lenses extending in a direction of length of said polarization conversion unit, arranged in the direction of the arrangement of said polarization conversion units.

14. The projection display apparatus according to claim 11, wherein said superimposing device includes a plurality of convex-prismatic lenses extending in a direction of length of said polarization conversion unit, arranged in the direction of the arrangement of said polarization conversion units in such a manner that mating faces of adjacent convex-prismatic lenses are on the incident axis of said polarization conversion unit.

* * * * *